United States Patent
Bretz et al.

(10) Patent No.: US 12,240,707 B2
(45) Date of Patent: Mar. 4, 2025

(54) DEVICE FOR TRANSFERRING ITEMS TO BE CONVEYED BETWEEN TWO CONVEYOR DEVICES AND A CONVEYOR SYSTEM AND A TRANSFER METHOD

(71) Applicant: Ferag AG, Hinwil (CH)

(72) Inventors: Markus Bretz, Herrliberg (CH); Marcel Schneider, Cham (CH)

(73) Assignee: FERAG AG, Hinwil (CH)

( * ) Notice: Subject to any disclaimer, the term of this patent is extended or adjusted under 35 U.S.C. 154(b) by 183 days.

(21) Appl. No.: 17/959,393

(22) Filed: Oct. 4, 2022

(65) Prior Publication Data
US 2023/0114128 A1 Apr. 13, 2023

(30) Foreign Application Priority Data
Oct. 7, 2021 (CH) ................. 070354/2021

(51) Int. Cl.
*B65G 47/64* (2006.01)
*B65G 57/06* (2006.01)

(52) U.S. Cl.
CPC .................... *B65G 47/64* (2013.01)

(58) Field of Classification Search
CPC ....... B65G 47/64; B65G 47/643; B65G 57/06
USPC ............. 198/369.1, 369.2, 369.7; 414/790.5
See application file for complete search history.

(56) References Cited

U.S. PATENT DOCUMENTS

| | | | |
|---|---|---|---|
| 3,027,817 A * | 4/1962 | Loeffler ................. | B65H 33/08 235/98 R |
| 4,938,657 A * | 7/1990 | Benson .................. | B65G 57/06 271/192 |
| 5,287,952 A * | 2/1994 | Redaelli ............... | B65G 47/647 198/448 |
| 5,427,226 A * | 6/1995 | Ueda .................... | B65G 47/082 198/732 |
| 5,779,432 A * | 7/1998 | Pena ...................... | B65G 57/11 198/418.6 |
| 5,909,796 A * | 6/1999 | Soldavini ............. | B65G 47/647 198/369.2 |

(Continued)

FOREIGN PATENT DOCUMENTS

CH 713 082 A1 4/2018
CH 713 398 A1 7/2018
(Continued)

OTHER PUBLICATIONS

Switzerland Search Report dated Feb. 10, 2022, Application No. CH70354/21, 1 page.

*Primary Examiner* — Douglas A Hess
(74) *Attorney, Agent, or Firm* — Rankin, Hill & Clark LLP

(57) ABSTRACT

A transfer device for transferring items to be conveyed, such as flat goods, from a feed conveyor to conveyor spaces of an onward conveyor. The transfer device forms a stationary receiving space for at least one item to be conveyed, the receiving space being delimited at the bottom by a movable support element. The support element is movable via a displacing device between a support position, in which the at least one item to be conveyed lies flat on the support element, and a delivery position, in which the item to be conveyed falls, under the influence of gravity through a released transfer opening downwards, and onto a conveyor space of the onward conveyor that is displaced past below the receiving space.

26 Claims, 8 Drawing Sheets

(56) References Cited

U.S. PATENT DOCUMENTS

| | | | | |
|---|---|---|---|---|
| 6,053,695 | A * | 4/2000 | Longoria | B65G 57/11 |
| | | | | 414/788.9 |
| 7,080,968 | B2 * | 7/2006 | Blackwell | B65H 31/06 |
| | | | | 198/418.6 |
| 7,125,216 | B2 * | 10/2006 | Grewe | B65H 31/32 |
| | | | | 414/794.4 |
| 7,547,184 | B2 * | 6/2009 | Dall'Omo | B65G 47/647 |
| | | | | 414/791.1 |
| 7,905,344 | B2 * | 3/2011 | Fritsche | B65H 29/26 |
| | | | | 198/704 |
| 9,420,828 | B2 * | 8/2016 | Ugrewicz | A24C 5/35 |
| 10,696,485 | B2 * | 6/2020 | Ratto | B65G 15/24 |

FOREIGN PATENT DOCUMENTS

| | | |
|---|---|---|
| DE | 198 45 527 A1 | 4/2004 |
| DE | 10 2005 031 493 A1 | 1/2007 |
| DE | 10 2012 204 824 A1 | 9/2013 |
| WO | 2021/037609 A1 | 3/2021 |

* cited by examiner

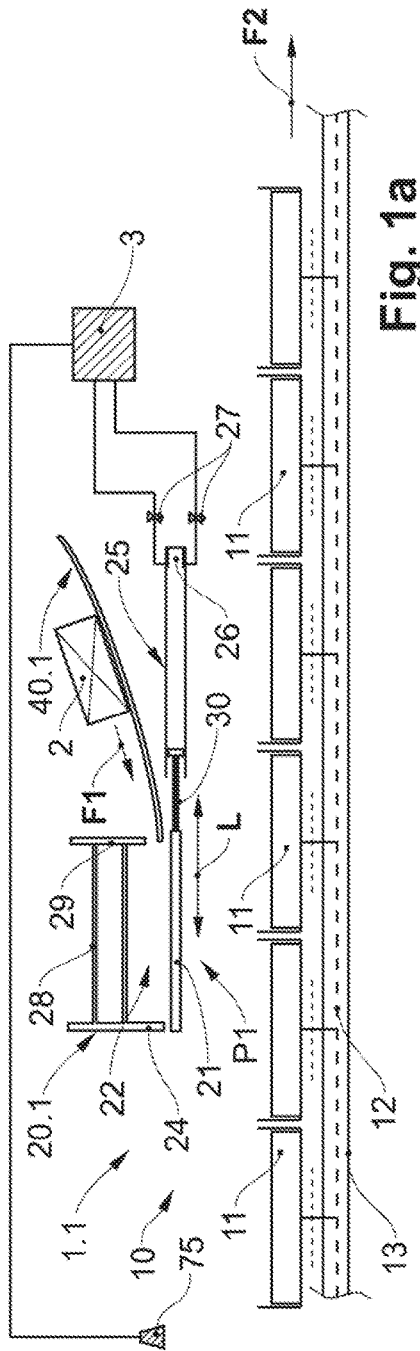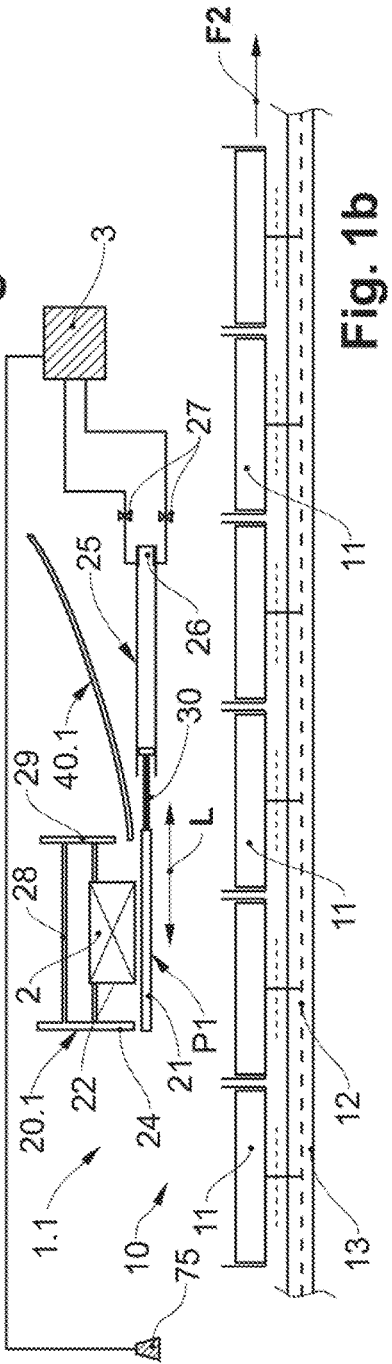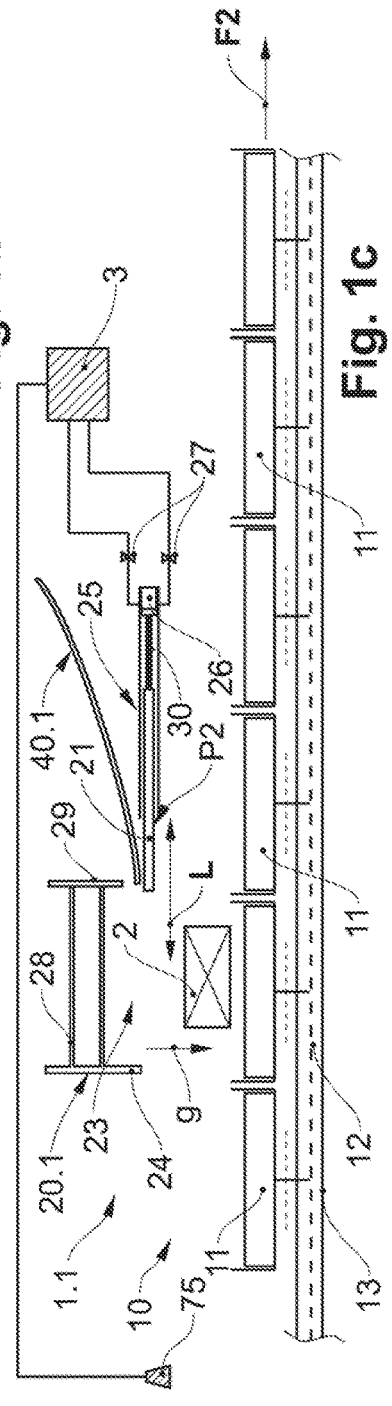

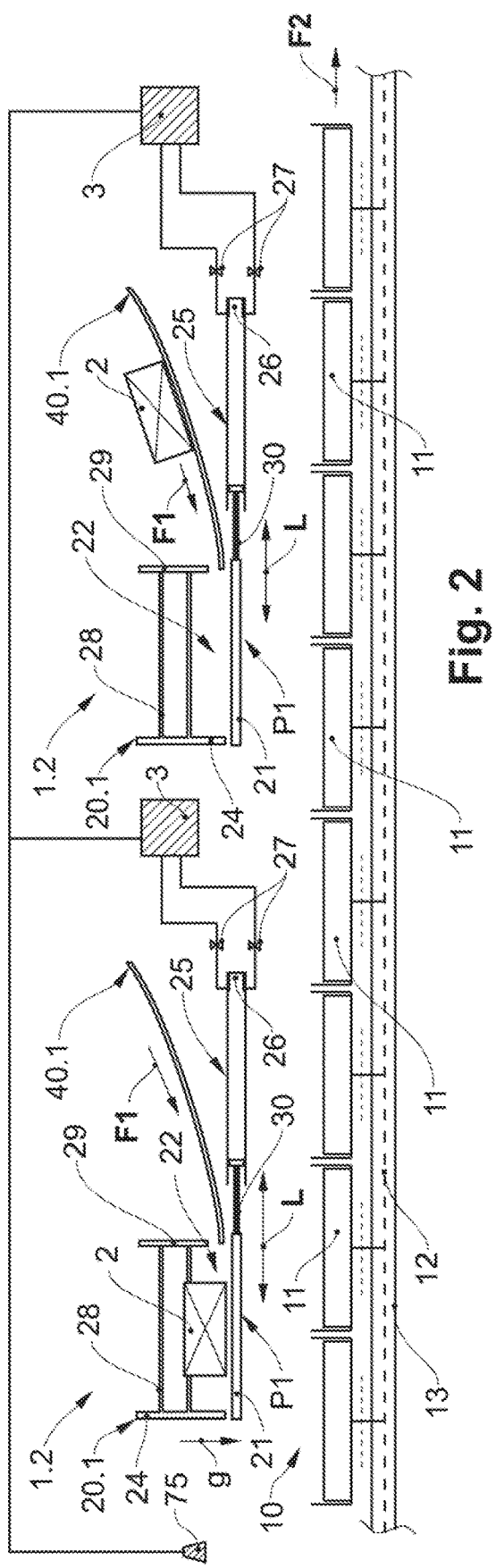
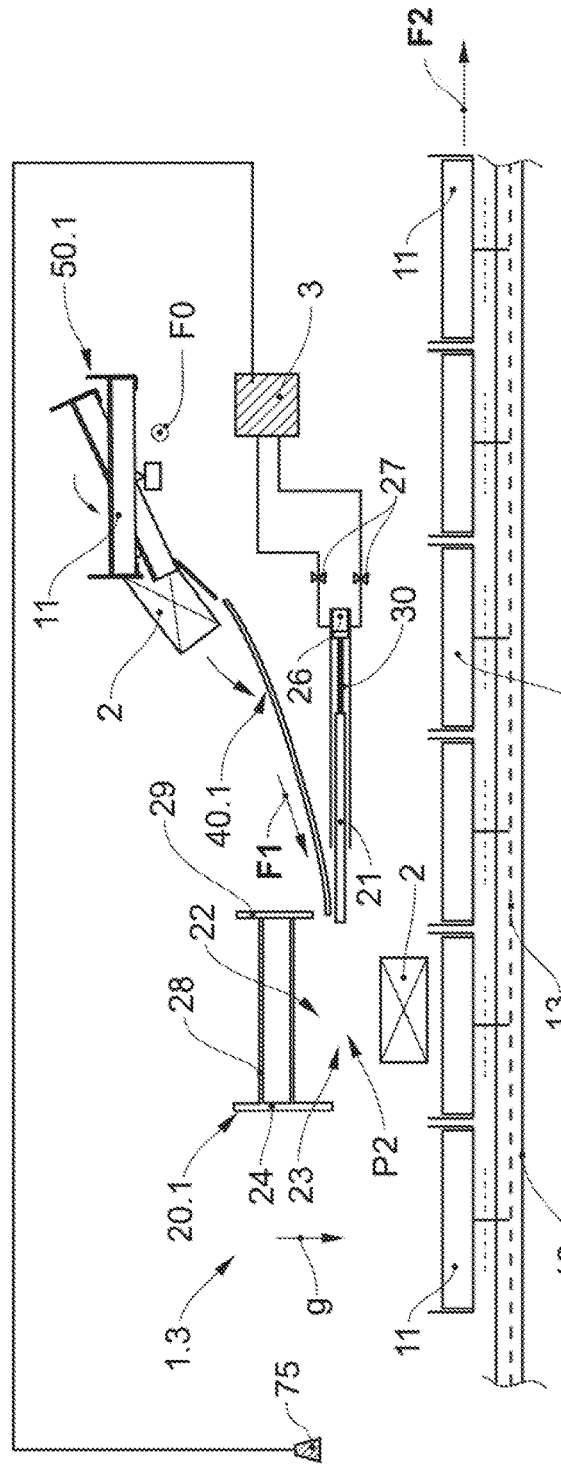
Fig. 2
Fig. 3

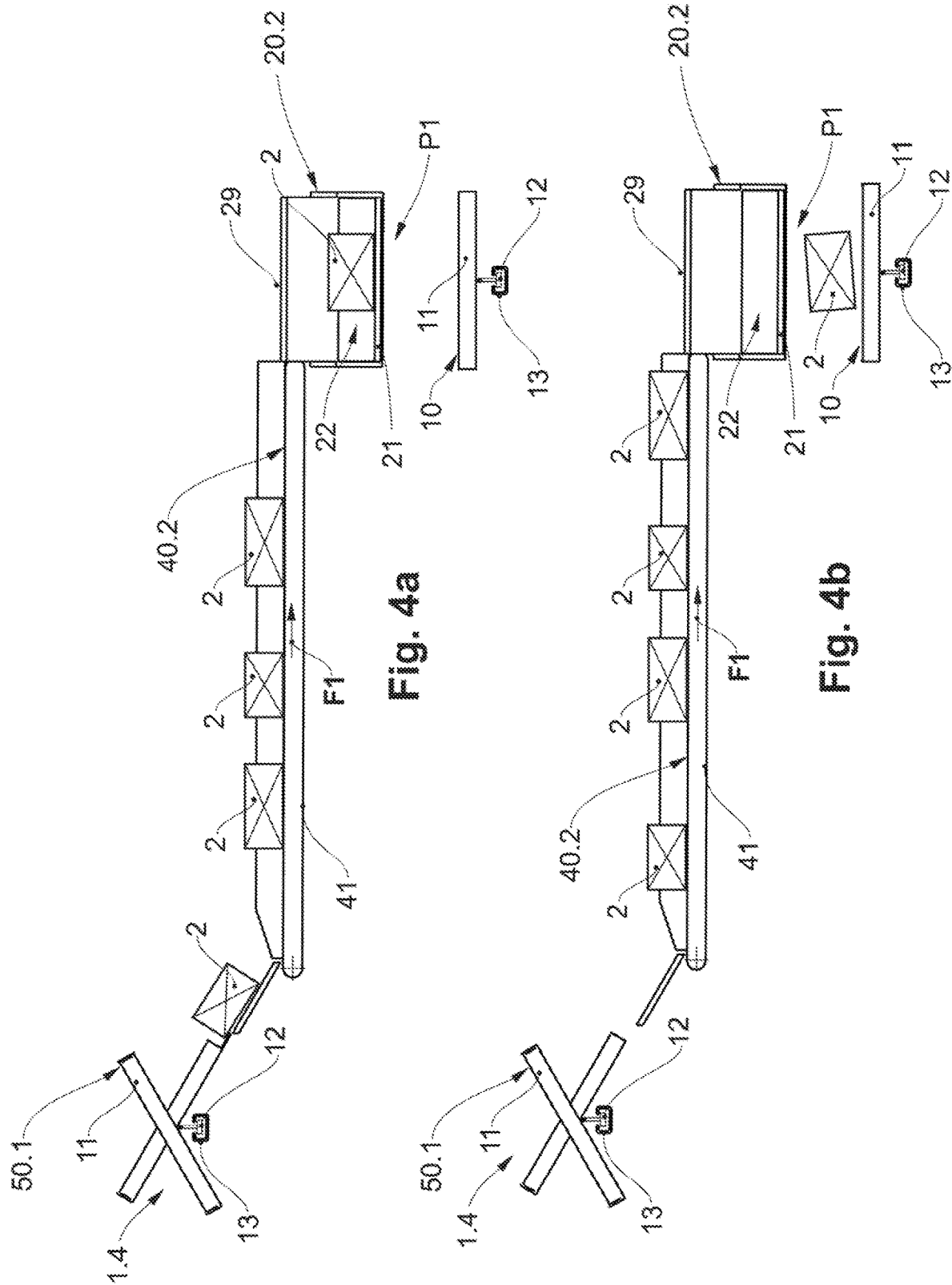

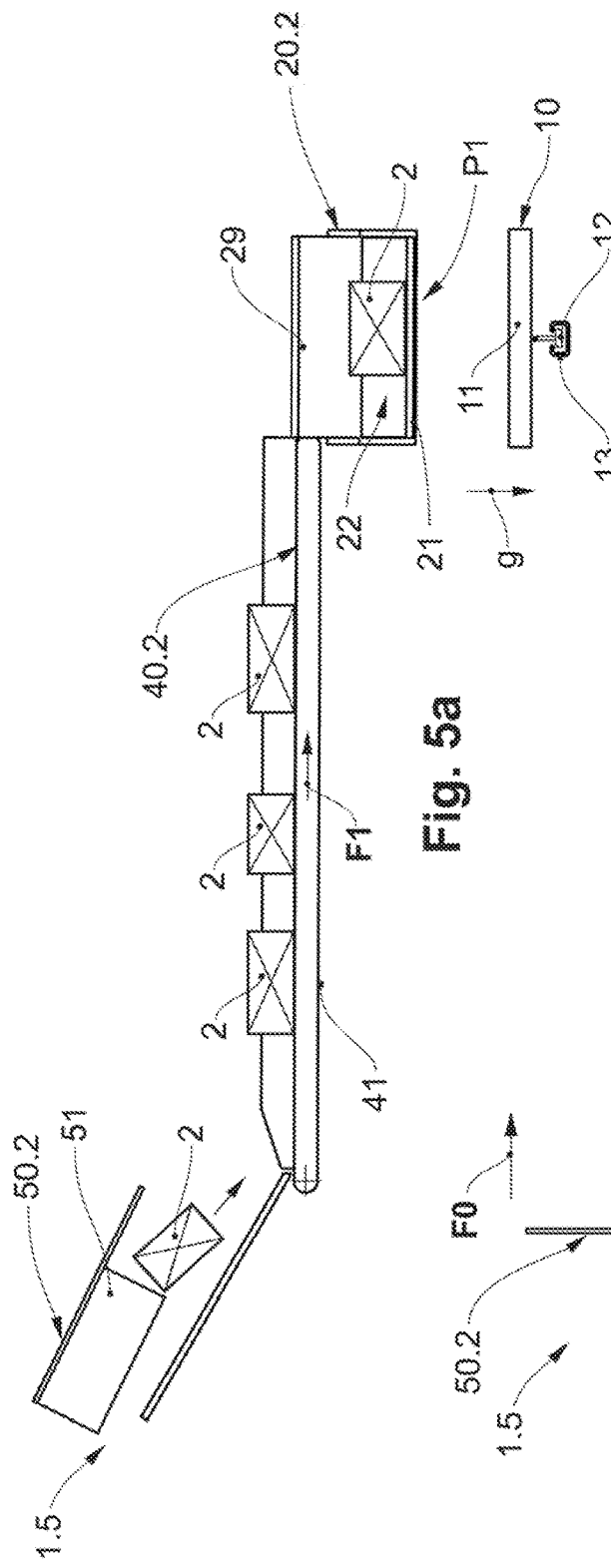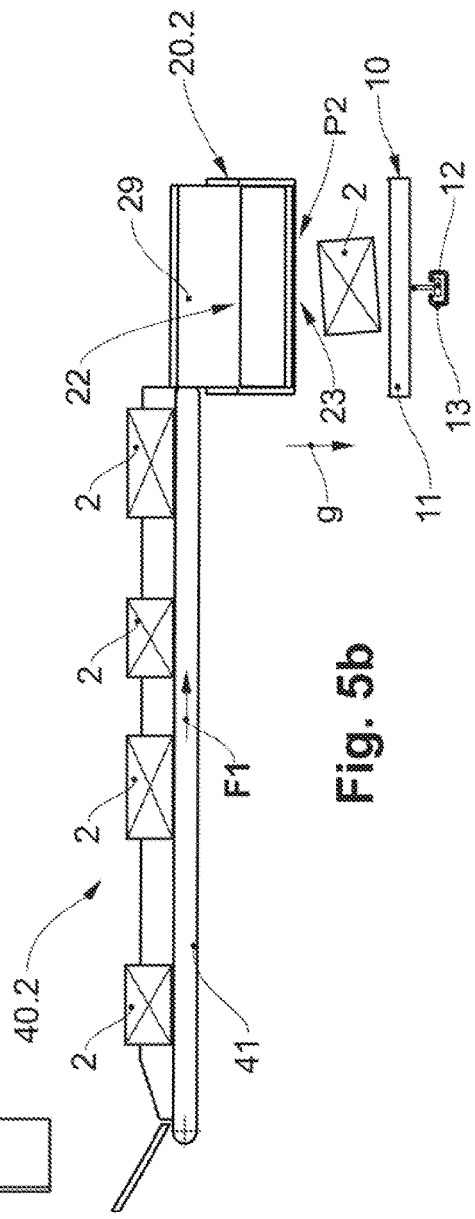

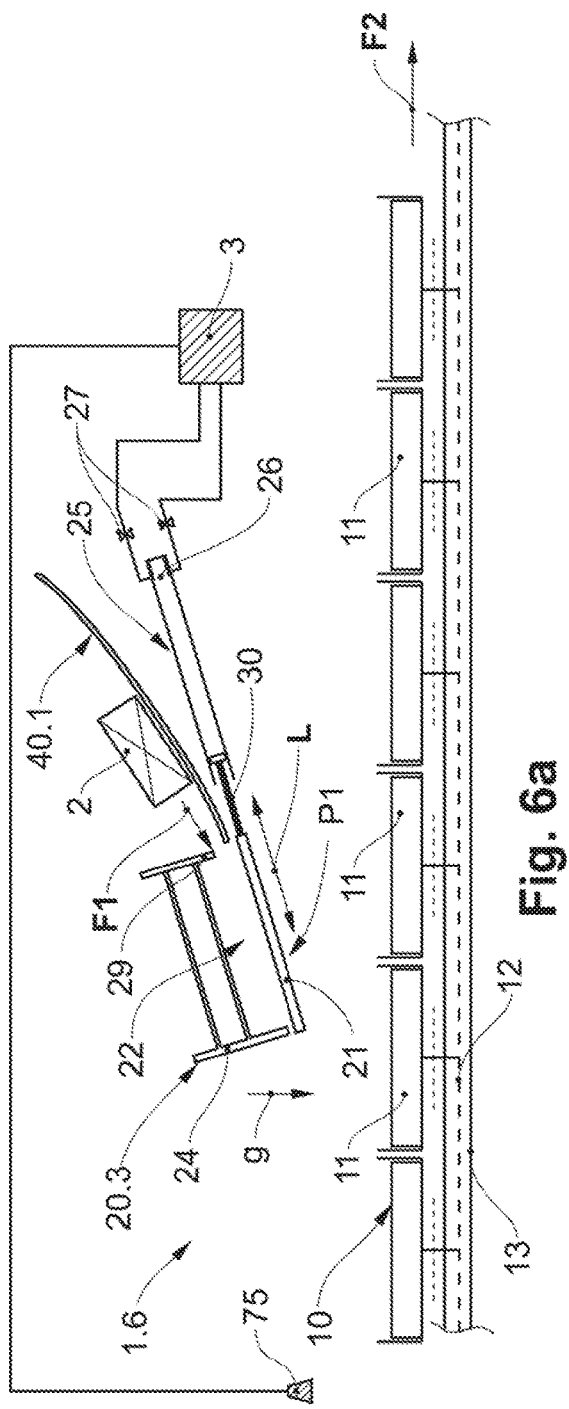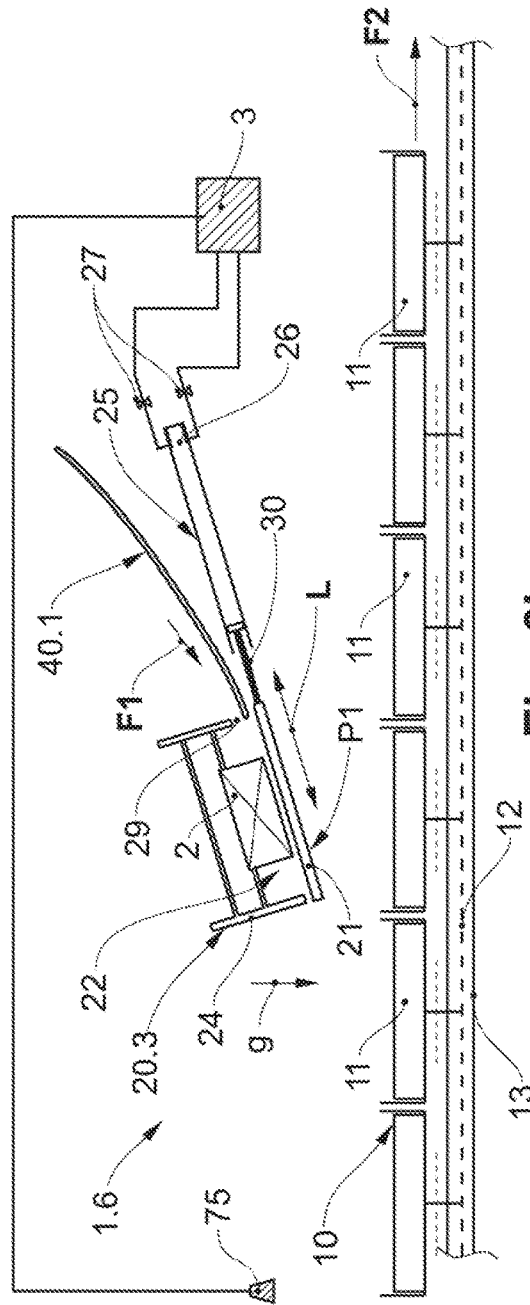

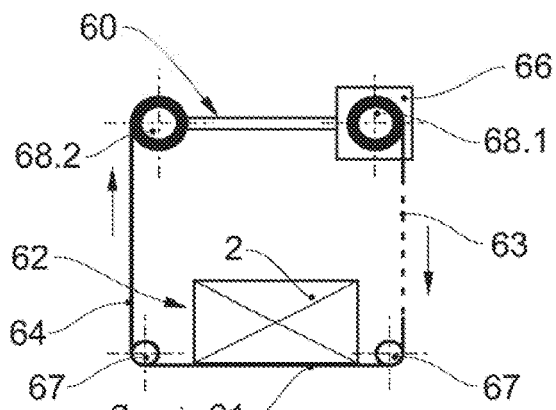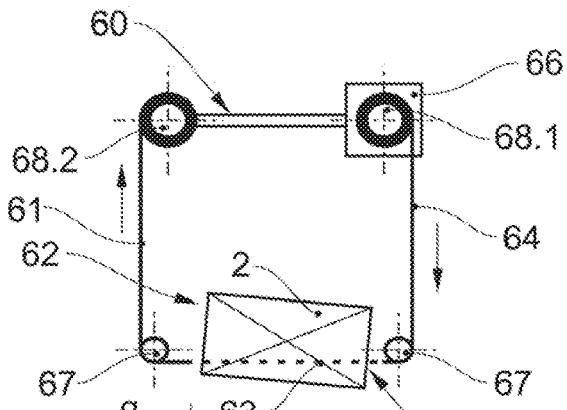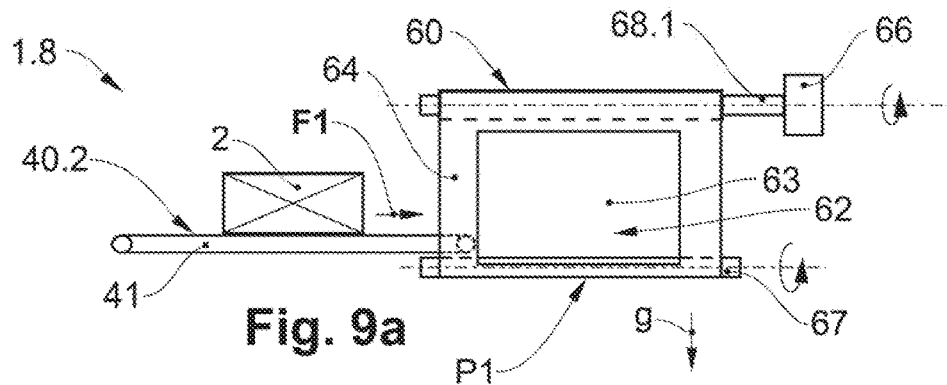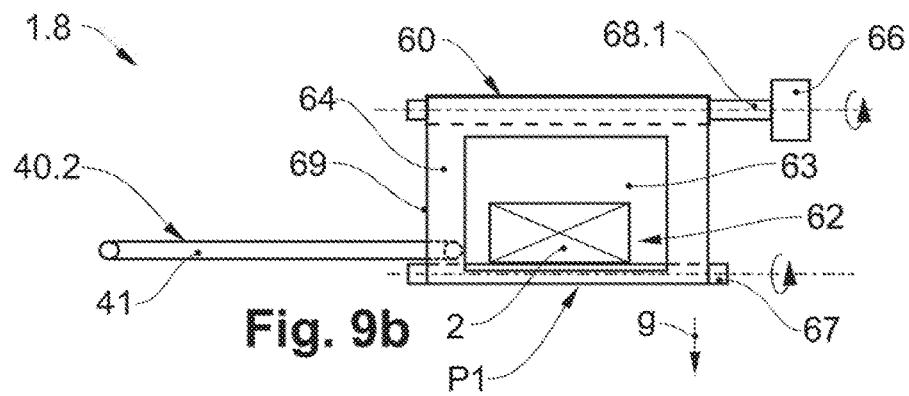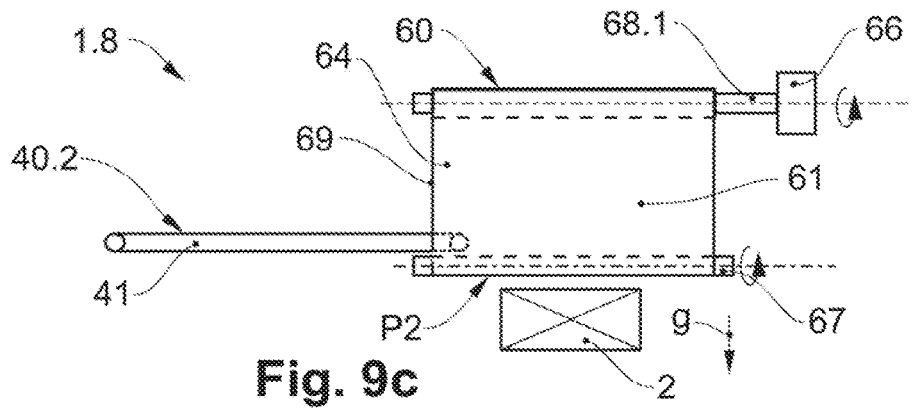

DEVICE FOR TRANSFERRING ITEMS TO BE CONVEYED BETWEEN TWO CONVEYOR DEVICES AND A CONVEYOR SYSTEM AND A TRANSFER METHOD

BACKGROUND OF THE INVENTION

Field of the Invention

The invention is in the field of conveyor technology and relates to a transfer device for transferring items to be conveyed from a feed conveyor to an onward, conveyor (a removal conveyor), and a conveyor system having a transfer device and an associated transfer method.

Description of the Art

Due to increasing online trade, ever larger quantities of items to be conveyed, such as parcels or bagged goods, are being processed in transshipment hubs. The large quantities of items to be conveyed are a major challenge for the transshipment hubs. The items to be conveyed should be processed as quickly as possible in the transshipment hubs so that the items to be conveyed reach their recipients as quickly as possible.

The incoming items to be conveyed are fed into sorting and distribution systems in the transshipment hubs. For this purpose, the incoming items to be conveyed are placed on the conveying surface of a delivery conveyor, and the conveyor conveys the items to be conveyed to a sorter and transfers the items thereto.

The sorter can be designed, for example, as a so-called tilt tray conveyor, having tiltable conveyor trays for delivering items to be conveyed. The items to be conveyed in tilt trays are conveyed past the delivery points by means of the tilt tray conveyor. As soon as the item to be conveyed has reached the correct delivery point, the tilt tray is set in an inclined position via a tilting mechanism and the items to be conveyed slide off the conveyor tray laterally at the relevant delivery point.

SUMMARY OF THE INVENTION

It is now an object of the present invention to propose a transfer device enabling a clock-synchronous transfer of items to be conveyed from a feed conveyor to an onward conveyer, i.e. a removal conveyor. At the same time, the transfer device should be designed to be as simple and space-saving as possible.

Furthermore, via the transfer device, individual items to be conveyed should also be able to be temporarily buffered, that is, temporarily stored, in order to ensure clock-synchronous transfer to a free conveyor space of the onward conveyor.

Furthermore, the transfer device should ensure the gentlest possible transfer of the items to be conveyed to the onward conveyor.

The invention thus relates to a transfer device for transferring items to be conveyed, such as lying goods, from a feed conveyor to conveyor spaces on an onward conveyor. The invention relates in particular to a transfer device for transferring lying goods from a flow of goods from a feed conveyor to conveyor spaces of an onward conveyor.

According to the invention, the transfer device forms a stationary receiving space for at least one item to be conveyed, the receiving space being delimited at the bottom by a movable support element. The support element can be displaced, i.e. moved, by means of a displacing device, i.e. motion device, between a support position, in which the at least one item to be conveyed can lie flat on the support element in the receiving space, and a delivery position, in which the item to be conveyed can be displaced, i.e. fall, downwards by gravity through an exposed, i.e. released, transfer opening out of the receiving space onto a conveyor space of the onward conveyor, i.e. removal conveyor, being displaced, i.e. moved, past below the receiving space.

Hence, the item to be conveyed is transferred from the transfer device to the onward conveyor in a falling manner.

In the delivery position of the support element, the at least one item to be conveyed can fall down by means of gravity through a released transfer opening, in particular through a transfer opening which is released downwards by the support element, onto a conveyor space of the onward conveyor, i.e. removal conveyor, being displaced, i.e. moved, past below the receiving space.

The support element can be displaced, i.e. moved, in particular laterally, that is, to the side out of the support position and again laterally, that is, from the side, into the support position.

According to a refinement of the invention, the support element can be displaced, i.e. moved, linearly between the support position and the delivery position. The support element can in particular execute a back and forth movement.

The support element can be designed in particular as a slide element. The slide element is in particular rigid.

According to a refinement of the invention, the displacing device for executing the linear movement of the support element contains a linear drive that can be activated by a control device.

The linear drive is in particular a pneumatic cylinder. For this purpose, the support element can be coupled to the cylinder piston of the pneumatic cylinder. The hub movement of the cylinder piston brings about the linear movement of the support element. The pneumatic cylinder can be actuated via valves such as opening and closing valves. The valves are activated by the control device.

The pneumatic cylinder can in particular be a double-acting cylinder in which the cylinder piston is extended by pressure on one active side and retracted again by pressure on the other active side.

Alternative drives, such as hydraulic cylinders or electric motors, for example, linear motors for displacing or linear movement of the support element are also possible.

According to an alternative embodiment variant, the support element is formed by a belt section of a flexible belt, the belt section forming a support surface for the item to be conveyed. The belt section, hereinafter referred to as support belt section, is characterized by a support surface for the items to be conveyed, the support surface retaining the items to be conveyed.

The term "support surface" is generally understood to mean the surface of the support element on which the item to be conveyed can lie. The support surface can, but does not have to, form a continuous surface. Rather, the support surface can also have interruptions or openings.

The support belt section delimits the receiving space towards the bottom in the support position. The flexible belt also has, in particular, a further belt section forming the transfer opening. Displacing the flexible belt can now arrange the belt alternately having the support belt section thereof or having the belt section thereof having the transfer opening below the receiving space.

For this purpose, a first end of the flexible belt can be fastened to a first winding roller and second end thereof to a second winding roller. The winding rollers can be driven by a corresponding drive.

The displacing of the belt sections or the support belt section below the receiving space can now take place by unwinding a belt section from a first winding roller and simultaneously winding up a corresponding belt section on the second winding roller. The counter-movement takes place by reversing the unwinding and winding process.

Lateral deflection rollers are arranged below the receiving space for tensioning the corresponding belt section, the lateral deflection rollers guiding the flexible belt in a deflection, in particular upwards and in particular to a winding roller. However, it is also possible for the deflection rollers to be formed by the winding rollers themselves.

Due to the unwinding and winding process, the support belt section can now be displaced laterally out of the support position and at the same time the belt section having the transfer opening can be displaced laterally into the delivery position. By means of the opposite direction of movement, the support belt section can be displaced laterally into the support position thereof and at the same time the belt section having the transfer opening can be displaced laterally out of the delivery position thereof.

The flexible belt, in particular the support belt section thereof, for example, can be a fabric belt. The flexible belt, in particular the support belt section thereof, can be a uniform plastic belt, such as a rubber belt. The belt can also be designed as a thin-walled but durable film. In the belt section having the transfer opening, the flexible belt can also only consist of one or more thin cables, cords or threads, in particular arranged laterally. Thin cables, cords or threads can also be provided to reinforce the flexible belt, in particular to reinforce the belt section having the transfer opening.

The transfer device has in particular a feed opening for lateral feeding the item to be conveyed to the transfer device or into the receiving space of the transfer device. This means that the feed opening is designed for feeding in the item to be conveyed from the side. The feed opening is designed in particular for the item to be conveyed to slide laterally onto the support element.

According to a first embodiment, the feed opening is arranged on the side of the support element located in the support position. The item to be conveyed can thus be conveyed laterally, that is, from the side, onto the support element.

According to the present embodiment, the transfer device has in particular a stop opposite the feed opening for stopping the item to be conveyed and being conveyed onto the support element.

According to a second embodiment, the feed opening is arranged above the support element located in the support position. Here, too, the item to be conveyed can be conveyed laterally, that is, from the side of the transfer device. However, the item to be conveyed is not conveyed laterally onto the support element, but instead falls through the feed opening arranged above the support element onto the support element located below in the support position.

The support surface of the support element in the support position can be horizontal. According to the present embodiment, the item to be conveyed, which falls down during the transfer, strikes the conveyor space of the onward conveyor, in particular with one surface side.

However, it is also conceivable that the support surface of the support element is inclined in the support position.

According to the present embodiment, an edge section of the item to be conveyed falling down during the transfer first strikes the conveyor space of the onward conveyor and the item only then lies flat on the conveyor space.

The support surface can be inclined in particular parallel to the conveying direction of the onward conveyor. In particular, the support surface can be inclined obliquely downwards towards the conveyor spaces of the onward conveyor. The receiving space is, at the low-lying edge or at the low-lying end of the support surface, in particular delimited by a stop, for example, by a wall.

The support surface is inclined downwards, in particular in the conveying direction of the feed conveyor or in the feed direction.

An inclined support surface has the advantage that the fed item to be conveyed slips in the direction of the low-lying end of the support surface and strikes a stop there. This guarantees a defined position of the item to be conveyed in the receiving space, which is important for a precise transfer of the item to be conveyed to a conveyor space of the onward conveyor located below. Due to the inclined support surface, the item to be conveyed assumes the defined position substantially independently of the feed speed. This is not necessarily the case, for example, for a horizontal support surface.

The support surface can be inclined, for example in the conveying direction of the onward conveyor, obliquely downwards towards the conveyor spaces of the onward conveyor. Alternatively, the support surface can also be inclined downwards, counter to the conveying direction of the onward conveyor, towards the conveyor spaces of the onward conveyor.

Furthermore, it is also conceivable that the support surface has an inclination transverse to the conveying direction of the onward conveyor. The support surface can be inclined downwards in the conveying direction of the item to be conveyed.

If the support surface is inclined both transversely and parallel to the conveying direction of the onward conveyor, a support surface can be formed having a low-lying corner into which the item to be conveyed slips. As a result, the position of the item to be conveyed in the receiving space can be defined more precisely than if the item to be conveyed, for example, only slips to a low-lying edge.

With the exception of a lateral feed opening that may be present, the receiving space is delimited laterally, in particular by delimiting elements such as rigid or flexible walls, struts, grids or nets.

As already mentioned above, for inclined support surfaces, a delimitation in the form of a stop is formed, in particular on the lower-lying sides of the receiving space, so that the items to be conveyed cannot slip off the inclined support surface.

If the support element is formed by a belt section of a flexible belt, the flexible belt or belt sections of the flexible belt, which is deflected laterally upwards via deflection rollers, can also form a lateral delimitation.

The invention also relates to a conveyor system containing a feed conveyor, an onward conveyor having a plurality of conveyor spaces that can be displaced, i.e. moved, along a conveyor track, i.e. conveying path, and containing a transfer device for transferring items to be conveyed from the feed conveyor to conveyor spaces of the onward conveyor, as described above.

The conveyor system contains, in particular, a control device which, taking into account the fall height and the fall speed of the at least one item to be conveyed during the transfer and taking into account the position and conveying speed of the conveyor spaces of the onward conveyor, is designed for the clock-synchronous transfer of items to be conveyed to conveyor spaces of the onward conveyor that are being displaced past below the receiving space.

According to the invention, the fixed or stationary receiving space of the transfer device is arranged above the conveyor track of the onward conveyor, so that the item to be conveyed in the delivery position can fall down by gravity through the released transfer opening onto a conveyor space of the onward conveyor moving past below the receiving space. In particular, the transfer device as such is designed to be fixed or stationary.

The receiving space is arranged in particular a maximum of 75 cm and very particularly a maximum of 50 cm above a conveyor space of the onward conveyor located below the receiving space. The height of the receiving space above the onward conveyor is selected in particular so that, on the one hand, items to be conveyed in the conveyor spaces of the onward conveyor can be conveyed below the transfer device, and on the other hand, the items to be conveyed to be transferred do not have to endure an excessive fall height.

In particular, the onward conveyor forms discrete conveyor spaces on which items to be conveyed can be deposited. The discrete conveyor spaces are formed, for example, by individual conveyor elements of a conveyor means.

The onward conveyor can be a chain conveyor. The onward conveyor can include a driven conveyor chain, on which conveyor means for conveying items to be conveyed are arranged or fastened. The conveyor chain can be guided in a guide channel. The conveyor chains, for example, consist of individual trolleys linked together, which are guided rolling along the guide channel, for example.

The conveyor means can include conveying elements forming conveyor spaces, in particular discrete conveyor spaces, for items to be conveyed. The conveying elements can be, for example, conveyor trays, conveyor plates, conveyor belts, conveyor pockets, conveyor baskets, etc.

The conveyor chain and thus the conveyor means can form an endlessly revolving, closed loop. The conveyor chain can also be formed by the conveyor means directly, for example, including conveying elements linked to one another, such as conveying elements of the type described above.

Synchronous movement of the conveyor spaces and constant distances between the conveyor spaces can be guaranteed thanks to the direct or indirect linking of the conveyor elements.

The onward conveyor can thus be a tray conveyor, such as a tilt tray conveyor, in which the conveying elements are formed by trays or tilt trays arranged one behind the other along the conveyor track. Tilt trays are characterized by the fact that they can be tilted to the side, for example, can only be tilted on one or both sides. In particular, the trays are connected to one another via a driven conveyor chain, as described above.

The onward conveyor can also be a cross-belt conveyor, in which the conveying elements are formed by drivable cross-belts forming a conveying surface for the item to be conveyed. The conveyor elements having the cross-belts are connected to one another in particular via a driven conveyor chain, as described above. Such a cross-belt conveyor is described in DE 198 45 527 A1, for example.

It is also possible for the onward conveyor to have a flat, driven conveying element, such as a mat chain, conveyor belt or plate chain. Correspondingly, the onward conveyor can be a mat chain conveyor, belt conveyor or plate chain conveyor.

Conveying aids such as conveyor trays or conveyor containers can be arranged or lie loosely on the flat conveying element, that is, not connected, the conveying aids forming discrete conveyor spaces and being transported by the conveying element.

The onward conveyor can also be a shoe conveyor having ejection elements that can be displaced from the side across the conveying surface. A shoe conveyor is described, for example, in WO 2021/037609 A1.

The feed conveyor may be or contain an intermediate conveyor. The intermediate conveyor conveys the items to be conveyed, in particular between a delivery conveyor and the transfer device. The intermediate conveyor can thus be arranged in the process sequence between a delivery conveyor and the transfer device.

The feed conveyor may be or may contain a belt conveyor having a conveyor belt. The feed conveyor may be or contain a conveyor chute. However, the feed conveyor may also be or contain such a delivery conveyor, as described further below.

The transfer device is arranged in the process sequence between the feed conveyor and the onward conveyor.

The feed conveyor is designed in particular for lateral feeding of the items to be conveyed to the transfer device.

In order to feed the items to be conveyed to the transfer device, the feed conveyor has in particular at least one conveyor component transverse to the conveying direction of the onward conveyor.

In order to feed the items to be conveyed to the transfer device, the feed conveyor can have at least one conveyor component parallel, in particular in the same direction, to the conveying direction of the onward conveyor.

According to a further refinement of the conveyor system, a plurality of transfer devices of the type according to the invention described above are arranged along the conveyor track of the onward conveyor. The transfer devices can each be fed from different delivery conveyors, that is, loaded with items to be conveyed. The transfer devices can also be fed from the same delivery conveyor, that is, loaded with items to be conveyed.

According to a refinement of the invention, the conveyor system is a sorting system for the targeted distribution of items to be conveyed.

The onward conveyor is in particular a sorter. According to the present embodiment variant, the conveyor track of the onward conveyor leads in particular through a delivery area having delivery points arranged along the conveyor track. The items to be conveyed are delivered to the delivery points according to specific sorting and distribution criteria.

The sorting system is used, for example, to sort packages, for example, by destination, shape (geometry), size or weight.

According to a refinement of the invention, the conveyor system is an order-picking system for order-picking items to be conveyed, such as a customer order. The order-picking system is used, for example, to collect items from customer orders, for example, from online trading. The items to be conveyed correspond here to so-called picking goods.

According to a refinement of the invention, a sensor device for detecting the occupancy or non-occupancy of the conveyor spaces of the onward conveyor that are displaced past the sensor device is arranged along the conveyor track of the onward conveyor and in the conveying direction of the onward conveyor in front of the transfer device. The sensor device can, for example, include an optical sensor such as a camera or light barrier.

The sensor device is connected to the control device and transmits the information about the occupancy or non-occupancy of the conveyor spaces of the onward conveyor to the control device.

The control device can thus make the delivery of an item to be conveyed from the delivery conveyor to the transfer device dependent on the conveyor space on the onward conveyor, that the conveyor space on the onward conveyor, which is allocated to the item to be conveyed to be transferred, is free. This means that the control device only sends the control signal for delivering an item to be conveyed from the delivery conveyor to the transfer device if the transfer device can allocate a free conveyor space on the onward conveyor to the item to be conveyed to be delivered based on the occupancy information transmitted by the sensor device. This means that the item to be conveyed is delivered from the delivery conveyor depending on a free conveyor space on the onward conveyor.

Alternatively or additionally, the control device can be designed such that the device only gives the control signal for transferring an item to be conveyed from the transfer device to the onward conveyor if, based on the occupancy information transmitted by the sensor device, the item can allocate a free conveyor space on the onward conveyor to the item to be conveyed to be transferred. This means that the item to be conveyed is transferred from the transfer device depending on a free conveyor space on the onward conveyor.

This prevents the items to be conveyed from being transferred from the transfer device to conveyor spaces of the onward conveyor that are already occupied.

The conveyor system can also contain a delivery conveyor for delivering items to be conveyed to the feed conveyor. The delivery conveyor may be a conveyor of the type described above in connection with the onward conveyor. The delivery conveyor can be a tray conveyor, such as a tilt tray conveyor, a pocket conveyor, a cross-belt conveyor or a shoe conveyor.

In principle, the feed conveyor itself can also be designed as a delivery conveyor. In this case, the items to be conveyed are delivered directly to the transfer device by the delivery conveyor.

A delivery conveyor in the form of a tilt tray conveyor delivers the items to be conveyed at a delivery point by tilting the conveyor trays to the feed conveyor.

A delivery conveyor in the form of a pocket conveyor having hanging conveyed conveyor pockets delivers the items to be conveyed at a delivery point by tilting the conveyor pockets to the feed conveyor. This is done by raising the bottom of the pocket so that the pocket opening points downwards and the item to be conveyed slides out of the conveyor pocket through the pocket opening due to the force of gravity.

Alternatively, the items to be conveyed can also leave the conveyor pockets on the side or through opening bottoms of the pockets.

The delivery conveyor can be arranged above or over the onward conveyor, particularly in the area where the items to be conveyed are delivered to the feed conveyor. The delivery conveyor can cross the onward conveyor in the area of delivery or transfer of the items to be conveyed. The delivery conveyor can be arranged parallel to the onward conveyor in the area of delivery or transfer of the items to be conveyed.

The invention further relates to a method for transferring items to be conveyed by means of a conveyor system described above from a feed conveyor to conveyor spaces of an onward conveyor that are displaced along a conveyor track.

According to the invention, the item to be conveyed is conveyed by the feed conveyor onto the support surface of the support element, so that the item to be conveyed lies flat on the latter. To transfer the at least one item to be conveyed to a conveyor space of the onward conveyor that is displaced past below the receiving space, the support element is displaced laterally away from the support position and into the delivery position by means of the displacing device, releasing a transfer opening. As a result, the at least one item to be conveyed falls by means of gravity through the released transfer opening onto a conveyor space of the onward conveyor that is displaced past below the receiving space.

The item to be conveyed falls, in particular unguided, and very particularly in free fall, through the transfer opening downwards onto a conveyor space of the onward conveyor that is displaced past below the receiving space.

The items to be conveyed are transferred by means of the control device, taking into account the fall height and the fall speed of the at least one item to be conveyed during the transfer and taking into account the position and conveying speed of the conveyor spaces of the onward conveyor, clock-synchronously to conveyor spaces of the onward conveyor that are displaced past below the receiving space.

The items to be conveyed are piece goods or individual goods, in particular of different geometry, size, weight, feel and consistency.

The piece goods or individual goods are in particular packaged goods, in particular individually packaged goods. The piece goods can be parcels or bagged goods.

Accordingly, the piece goods or individual goods in particular are transferred from the transfer device to the onward conveyor individually.

The items to be conveyed are in particular consumer goods. The items to be conveyed are in particular picking goods.

The items to be conveyed are in particular lying goods. Lying goods are characterized by lying conveyance and a flat support of the items to be conveyed on the conveying element.

The items to be conveyed can be flat goods.

The items to be conveyed are conveyed within the conveyor system, in particular in the form of flows of goods.

The conveyor system or the transfer device is used in particular for processing flows of goods, in particular for linking, that is, bringing together flows of goods.

The transfer device is used in particular to transfer items to be conveyed from the flow of goods from a feed conveyor or delivery conveyor into the flow of goods from an onward conveyor.

The transfer device can also perform the function of a buffer or temporary store, by means of which at least one item to be conveyed is temporarily stored until the item to be conveyed is transferred to the onward conveyor.

The transfer device is characterized in particular by the simple structure thereof made up of comparatively few components and the space-saving design thereof. Because of the arrangement thereof above the conveyor track of the onward conveyor, that is, because of the arrangement thereof in the third dimension, the transfer device requires only comparatively little additional floor space.

By laterally displacing the support element out of the support position thereof and laterally displacing the item into the support position, the distance between the receiving space of the transfer device and a conveyor space of the onward conveyor below the same, that is, the corresponding fall height, can be kept small. This enables gentle transfer of the items to be conveyed.

The items to be conveyed are further less exposed to the influence of air movements at a low fall height. This enables a more precise transfer of the items to be conveyed, in particular light items to be conveyed.

A minimization of the fall height is not possible, for example, in the case of a support element having pivoting elements pivoted downwards to release the transfer opening. The fall height here increases by the radius of the pivoting elements with respect to embodiments having laterally movable support elements, so that when the transfer opening is released, the pivoting elements do not pivot into the conveying flow of the items to be conveyed of the onward conveyor.

BRIEF DESCRIPTION OF THE DRAWINGS

The subject of the invention is explained in more detail below using exemplary embodiments illustrated in the accompanying figures. They each show schematically:

FIG. 1a: a side view of a conveyor system according to the invention according to a first embodiment variant;

FIG. 1b: a further side view of the conveyor system according to FIG. 1a;

FIG. 1c: a further side view of the conveyor system according to FIGS. 1a and 1b;

FIG. 2: a side view of the conveyor system according to FIGS. 1a to 1c having two transfer devices;

FIG. 3: a side view of the conveyor system according to FIGS. 1a to 1c having a delivery conveyor;

FIG. 4a: a side view of a conveyor system according to the invention according to a second embodiment variant;

FIG. 4b: a further side view of the conveyor system according to FIG. 4a;

FIG. 5a: a side view of a conveyor system according to the invention according to a third embodiment variant;

FIG. 5b: a further side view of the conveyor system according to FIG. 5a;

FIG. 6a: a side view of a conveyor system according to the invention according to a fourth embodiment variant;

FIG. 6b: a further side view of the conveyor system according to FIG. 6a;

FIG. 7b: a further side view of the conveyor system according to FIG. 7a;

FIG. 8a: a side view of a further embodiment variant of a transfer device according to the invention;

FIG. 8b: a side view of a conveyor system according to the invention according to a sixth embodiment variant having a transfer device according to FIG. 8a; and, FIGS. 9a to 9c: schematic illustrations of the functioning of the transfer device.

DETAILED DESCRIPTION OF THE INVENTION

Figure 7A:
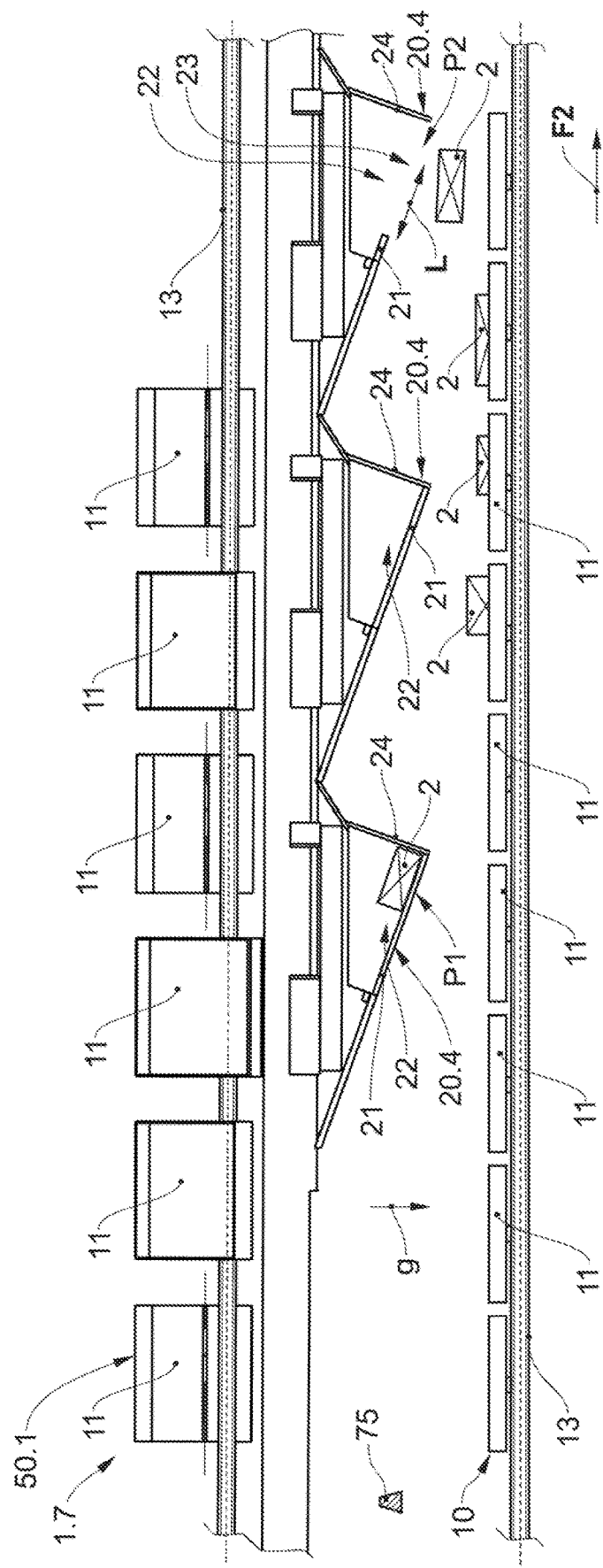
FIG. 7a: a side view of a conveyor system according to the invention according to a fifth embodiment variant.

In principle, the same parts are provided with the same reference symbols in the figures.

To understand the invention, certain features are not shown in the figures or are only shown in a highly abstracted manner. The exemplary embodiments described below are merely examples of the subject matter of the invention.

FIG. 1 shows a conveyor system 1.1 according to the invention having a feed conveyor 40.1 in the form of a conveyor chute, a transfer device 20.1 and having an onward conveyor 10 in the form of a tilt tray conveyor.

The transfer device 20.1 includes a support element 21 in the form of a rigid slide element having a horizontal support surface for the flat support of an item 2 to be conveyed. Above the support element 21, the transfer device 20.1 forms a receiving space 22 for the item 2 to be conveyed. Accordingly, the support element 21 forms a delimitation of the receiving space 22 at the bottom.

The support element 21 is connected to a displacing device 25 including a pneumatic cylinder 26. The support element 21 is coupled to the cylinder piston 30 of the pneumatic cylinder 26. The hub movement of the cylinder piston 30 displaces the support element 21 in a linear, horizontal movement. Accordingly, the support element 21 can be displaced by means of the displacing device 25 or the pneumatic cylinder 26 between a support position P1, in which the item 2 to be conveyed lies flat on the support surface of the support element 21, and a delivery position P2, in which the support element 21 releases a transfer opening 23 downwards.

Corresponding valves 27, such as closing and opening valves, are provided for controlling the pneumatic cylinder 26. The valves are activated by a control device 3.

The receiving space 22 of the transfer device 20.1 is arranged above the conveyor track of the onward conveyor 10. The onward conveyor 10 is a tilt tray conveyor having a plurality of tilt trays 11 arranged one behind the other along the conveyor track. The conveyor trays 11 are linked to one another via a driven conveyor chain 12 guided in a guide channel 13. Accordingly, the conveyor trays 11 are displaced synchronously with one another and at constant distances from one another.

The tilt tray conveyor 10 is in particular a tilt tray sorter, by means of which items 2 to be conveyed are sorted or distributed according to certain criteria. For this purpose, the conveyor trays 11 of the tilt tray sorter 10 are guided through a delivery area in which a plurality of delivery points are arranged one behind the other along the conveyor track of the tilt tray conveyor 10 (not shown). The items 2 to be conveyed are delivered to the delivery points according to specific sorting or distribution criteria by tilting the conveyor trays 11. Such a tilt tray sorter is described, for example, in CH 710 851 A1.

To transfer an item 2 to be conveyed, the item to be conveyed 2 is conveyed via the conveyor chute 40.1 by means of gravity in the conveying direction F1 to the transfer device 20.1. The item 2 to be conveyed slides through a feed opening 29 arranged laterally from the support element 21 located in the support position P1 onto the support element 21 and lies flat on the support element in a delivery position P1. So that the item 2 to be conveyed cannot slide over the support element 21 in the conveying direction F1, the transfer device 20.1 contains a stop 24 opposite the feed opening and which stops the item 2 to be conveyed sliding onto the support element 21. The receiving space 22 is consequently delimited laterally, among other things, by the feed opening 29 and the stop 24.

The stop 24 can, for example, be a wall or a grid. In principle, with the exception of the feed opening 29, the receiving space 22 can be laterally delimited by delimiting elements or by an enclosure 28, such as struts, walls, grids.

The transfer of the item 2 to be conveyed to the onward conveyor 10 is controlled by the control device 3, which takes into account the fall height and the fall speed of the item 2 to be conveyed during the transfer and takes into account the position and conveying speed of the conveyor trays 11 of the onward conveyor 10, for a clock-synchronous transfer of the item 2 to be conveyed into a conveyor tray 11 of the onward conveyor 10 that is displaced past below the receiving space 22.

To transfer the item 2 to be conveyed, the support element 21 is displaced laterally in a linear movement L from the support position P1 into the delivery position P2 by retracting the cylinder piston 30 of the pneumatic cylinder 26. A transfer opening 23 is released downwards during this process, through which transfer opening the item 2 to be conveyed falls unguided and in free fall by gravity g downwards onto a conveyor tray 11 of the onward conveyor 10 be displaced past below the receiving space 22.

After the item 2 to be conveyed has been transferred to the onward conveyor 10, the support element 21 is again displaced back into the support position P1 by means of a linear counter-movement. A new item 2 to be conveyed can be conveyed into the receiving space 22 above the support element 21.

The conveyor system 1.1 further contains a sensor device 75 for detecting the occupancy or non-occupancy of the conveyor trays 11 of the onward conveyor 10 that have been displaced past the sensor device 75. The sensor device 75 is connected to the control device 3 and has an optical sensor for detecting items 2 to be conveyed lying on the conveyor trays 11. The control device 3 controls the transfer of the items 2 to be conveyed into the conveyor trays 11 of the onward conveyor 10 depending on the occupancy or non-occupancy of the conveyor trays 11 on the onward conveyor 10 determined by the sensor device 75. The control device 3 thus gives the release or the control signal for the transfer of an item 2 to be conveyed from the transfer device 20.1 to the onward conveyor 10 only if, at the time of the transfer, a free conveyor tray 11 is displaced past below the receiving space 22 of the transfer device 20.1.

FIG. 2 shows a conveyor system 1.2 as already described in connection with FIG. 1, but with the difference that here two transfer devices 20.1 are arranged one behind the other along the conveyor track of the onward conveyor 10. For example, items 2 to be conveyed can be transferred to the conveyor trays 11 of the onward conveyor 10 by means of the transfer devices 20.1 from various feed conveyors or delivery conveyors (not shown).

FIG. 3 shows a conveyor system 1.3 as already described above in connection with FIG. 1, but in combination with a delivery conveyor 50.1 in the form of a tilt tray conveyor. Similar to the onward conveyor 10 according to FIGS. 1a to 1c, the tilt tray conveyor 50.1 contains a plurality of conveyor trays 11 connected to one another via a driven conveyor chain 12. The conveyor chain 12 is guided in a guide channel 13. The items 2 to be conveyed to be transferred are delivered from the tilt tray conveyor 50.1 to the chute conveyor 40.1 by tilting the transport trays 11 to the side. The item 2 to be conveyed here slips from the conveyor tray 11 tilted to the side, onto the conveyor chute 40.1 and from there into the transfer device 20.1.

The conveying direction F0 of the delivery conveyor 50.1 runs transversely to the conveying direction F2 of the onward conveyor 10 in the area where the items 2 to be conveyed are delivered.

FIGS. 4a and 4b show a further embodiment variant of a conveyor system 1.4 according to the invention. The conveyor system 1.4 contains a delivery conveyor 50.1 as has already been described in connection with FIG. 3. According to the present embodiment variant, the items 2 to be conveyed are delivered via a chute to a feed conveyor 40.2 in the form of a belt conveyor. The belt conveyor 40.2 includes a conveyor belt 41, conveying the items 2 to be conveyed lying thereon in the conveying direction F1 to the transfer device 20.2.

The transfer device 20.2 substantially corresponds to the transfer device 20.1 already described in FIGS. 1a to 1c, however, with the difference that the feed opening 29 is not arranged to the side of the support element 21 but above the support element 21. The item 2 to be conveyed is also conveyed laterally, that is, from the side, to the transfer device 20.2, the item 2 to be conveyed falling at the end of the conveyor belt 41 due to gravity through the feed opening 29 arranged above the support element 21 and down into the receiving space 22 and consequently onto the support element 21 and lying flat thereon.

By releasing the transfer opening 23 downwards by means of the control device 3, as is described in detail in connection with FIGS. 1a to 1c, the item 2 to be conveyed falls onto a conveyor tray 11 of the onward conveyor 10, which is conveyed past below the receiving space 22. The onward conveyor 10 has also already been described above in connection with FIGS. 1a to 1c.

FIGS. 5a and 5b show a further embodiment variant of a conveyor system 1.5 according to the invention. The conveyor system 1.5 substantially corresponds to the conveyor system 1.4 according to FIGS. 4a and 4b, but with the difference that the delivery conveyor 50.2 is a pocket conveyor having conveyor pockets 51.

To release the items 2 to be conveyed from the conveyor pockets 51, the conveyor pockets 51 are tilted "upside down" at the delivery point via a link guide (not shown) so that the bottom of the pocket is raised and the pocket opening points downwards and the item 2 to be conveyed can slide out of the conveyor pocket 51 due to the force of gravity and can slide further via a chute onto the conveyor belt 41 of the feed conveyor 40.2. The emptying of the conveyor pockets of a pocket conveyor is described, for example, in the publications CH 713 082 A1 and CH 713 398 A1.

FIGS. 6a and 6b show a further embodiment variant of a conveyor system 1.6 according to the invention. The conveyor system 1.6 substantially corresponds to the conveyor system 1.1 according to FIGS. 1a to 1c, but with the difference that the support surface of the support element 21 is inclined. According to the present embodiment variant, the support surface of the support element 21 is inclined downwards towards the conveyor trays 11 counter to the conveying direction F2 of the onward conveyor 10. As a result, the rear section of the item 2 to be conveyed falling through the released transfer opening 23 downwards onto the conveyor tray 11 of the onward conveyor 10 first strikes the conveyor tray 11 and the item only then lies flat on the conveyor tray 11. This prevents a flat side of the item 2 to be conveyed from striking the conveyor tray 11, as is the case, for example, for a support element having a horizontal support surface.

Figure 7B:
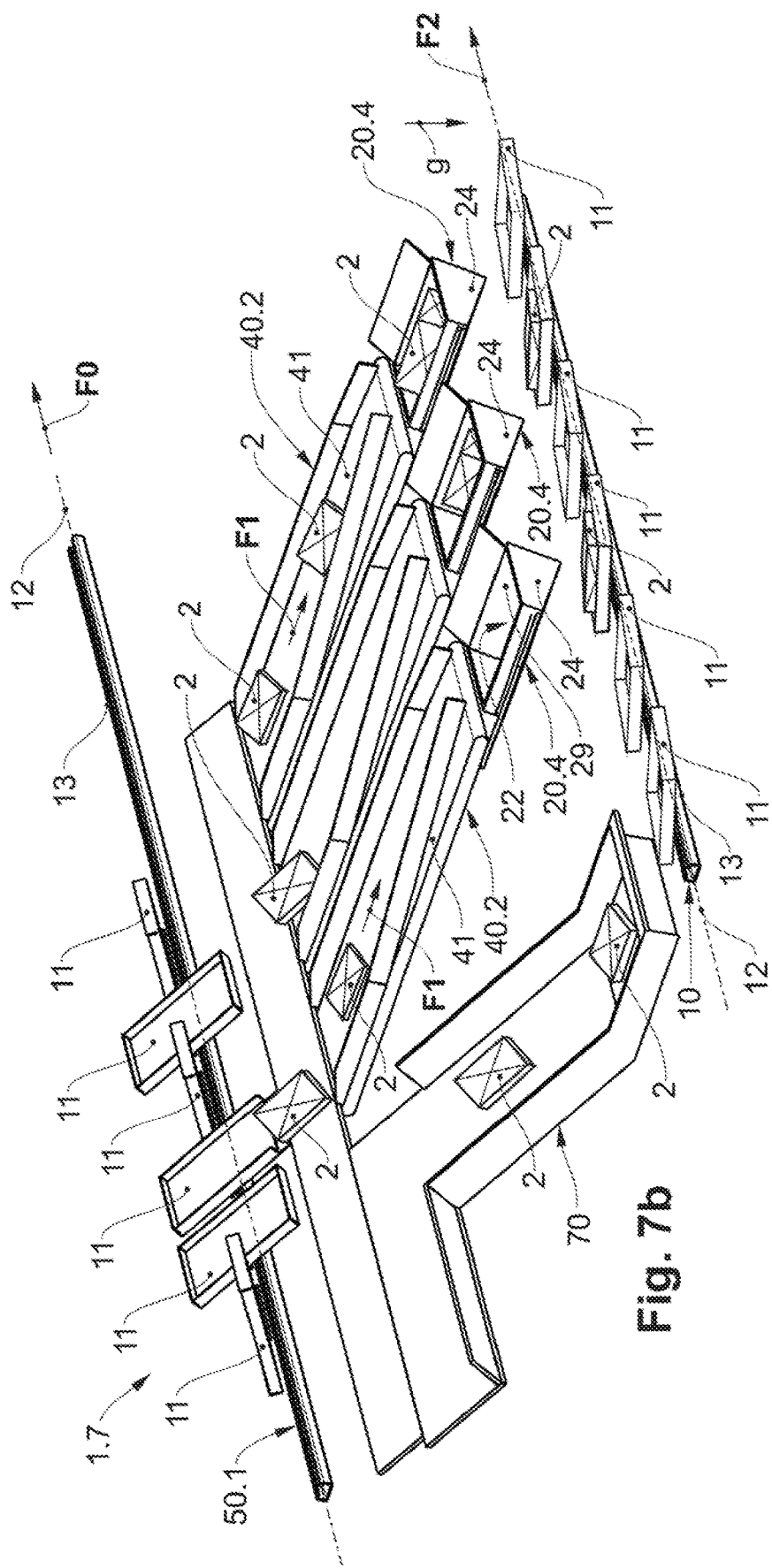

FIGS. 7a and 7b show a further embodiment variant of a conveyor system 1.7 according to the invention. The basic structure of the conveyor system 1.7 corresponds to the conveyor system 1.4 according to FIGS. 4a to 4b. According to the present embodiment variant, the items 2 to be conveyed are also delivered by a delivery conveyor 50.1 in the form of a tilt tray conveyor via a chute to a feed conveyor 40.2 in the form of a belt conveyor having conveyor belt 41 and fed laterally in the conveying direction F1 to the transfer device 20.4 and delivered into the receiving space 22 of the transfer device 20.4 via a feed opening 29 arranged above the support element 21.

However, the present embodiment variant differs from that according to FIGS. 4a and 4b by an inclined support surface of the support element 21, the support surface in the present case being inclined downwards in the conveying direction F2 of the onward conveyor 10 towards the conveyor trays 11 of the onward conveyor 10. Furthermore, the support surface of the support element 21 is also inclined transversely to the conveying direction F2, the inclination pointing obliquely downwards in the feed direction F1.

As a result, a front corner of the item 2 to be conveyed falling through the released transfer opening 23 downwards onto the conveyor tray 11 of the onward conveyor 10 first strikes the conveyor tray 11 and the item only then lies flat on the conveyor tray 11.

Alternatively, the support surface of the support element can also be aligned horizontally transversely to the conveying direction of the onward conveyor. As a result, the front section of the item to be conveyed falling through the released transfer opening downwards onto the conveyor tray of the onward conveyor first strikes the conveyor tray and the item only then lies flat on the conveyor tray.

In both cases, a flat side of the item 2 to be conveyed is also prevented from striking the conveyor tray 11, for example, for a support element having a horizontal support surface.

According to the present embodiment variant, three transfer devices 20.4 having corresponding feed conveyors 40.2 are arranged along the conveyor track of the onward conveyor 10. The transfer devices increase the transfer capacity from the delivery conveyor 50.1 to the onward conveyor 10.

However, it can also be provided that the transfer devices 20.4 are each loaded with items 2 to be conveyed by different delivery conveyors.

Furthermore, the conveyor system 1.7 contains a delivery device 70 in the form of a conveyor chute having a collecting compartment for catching and holding back the items 2 to be conveyed delivered from the delivery conveyor 50.1 to the delivery device 70. The delivery device 70 serves to transfer particularly sensitive items 2 to be conveyed to the onward conveyor 10. The items 2 to be conveyed cannot be transferred by means of a transfer device 20.4, since the free fall of the items 2 to be conveyed from the transfer device 20.4 onto the conveyor trays 11 of the onward conveyor would damage or impair the items 2 to be conveyed.

Rather, an item 2 to be conveyed delivered via the delivery device 70 is retained in the associated collecting compartment and placed by hand on a conveyor tray 11 of the onward conveyor 10.

Incidentally, it is conceivable that a similar arrangement of feed conveyors 40.2 and transfer devices 20.4 and a further onward conveyor 10 is arranged on the other side of the delivery conveyor 50.1, so that the conveyor trays 11 of the delivery conveyor 50.1 for delivery of the items 2 to be conveyed can be tilted on the left or right side.

FIGS. 8a and 8b show a further embodiment variant of a transfer device 60, which differs significantly from the transfer devices described above.

The support element 61 is formed here by a support belt section of a flexible belt 64 delimiting the receiving space 62 towards the bottom in the support position P1. Deflection rollers 67 for deflecting the flexible belt 64 are arranged on both sides of the support belt section 61. Starting from the support belt section 61, the flexible belt 64 is deflected on both sides around the deflection rollers 67 and guided up to winding rollers 68.1, 68.2 arranged above the deflection rollers 67 and fastened to the winding rollers 68.1, 68.2.

The transfer device 60 also includes a drive 66 for driving the winding rollers 68.1, 68.2. Winding rollers 68.1, 68.2 and drive 66 are part of the displacing device 65 for displacing the support belt section 61 between a support position P1 and a delivery position P2.

The flexible belt 64 includes a further belt section forming a transfer opening 63. The flexible belt 64 can now be unwound and wound up in both directions via the drive 66 between a first winding roller 68.1 and a second winding roller 68.2, so that the support belt section 61 and consequently also the belt section having the delivery opening 63 can be displaced between a support position P1 below the receiving space 62 and a delivery position P2 to the side of the receiving space 62.

The support belt section 61 is thereby displaced laterally out of the support position P1 or laterally into the support position P1.

FIGS. 9a to 9c, based on the conveyor system 1.8, illustrate the functioning of the transfer device 60 even better. An item 2 to be conveyed is conveyed laterally into the receiving space 62 of the transfer device 60 and thus onto the support belt section 61 of the flexible belt 64 via a feed conveyor designed as a belt conveyor 40.2 via a lateral feed opening 69. The feed opening 69 is arranged on the face side of the flexible belt 64 or of the deflection rollers 67 or winding rollers 68.1, 68.2. That is, the feed opening 69 is arranged on one of the two sides of the receiving space 62, which is not traversed by the flexible belt 64.

The support belt section 61 of the flexible belt 64 is located below the receiving space 62 when the item 2 to be conveyed is received in the support position P1, so that the item 2 to be conveyed in the receiving space 62 lies flat on the support belt section 61.

To transfer the item 2 to be conveyed to an onward conveyor 10 (not shown) arranged below the receiving space 62, the support belt section 61 is displaced laterally out of the support position P1 and upward over the deflection roller 67 in the direction of the second winding roller 68.2. Furthermore, the belt section having the transfer opening 63 is displaced downwards and around the deflection roller 67 laterally into the delivery position P2 below the receiving space. This is done by unwinding a belt section of the flexible belt 64 from the first winding roller 68.1 and simultaneously winding up a corresponding belt section of the flexible belt 64 through the second winding roller 68.1.

Correspondingly, the belt section having the transfer opening 63 comes to lie below the receiving space 62 so that the item 2 to be conveyed can fall through the transfer opening 63 down onto the onward conveyor 10 (not shown).

After the item 2 to be conveyed has been transferred, the flexible belt 64 is again displaced in the opposite direction, so that the support belt section 61 is displaced this time in the opposite direction around the deflection roller 67 again laterally into the support position P1 below the receiving space 62. At the same time, the belt section having the transfer opening 63 is displaced laterally again out of the delivery position thereof below the receiving space 62 and around the deflection roller 67 upwards in the direction of the first winding roller 68.1. This is done by repeating the unwinding and winding process, but this time in the opposite direction. The previously unwinding, first winding roller

68.1 is now the winding roller that is winding up and the previously winding, second winding roller 68.2 is now the unwinding winding roller 68.

The invention claimed is:

1. A conveyor system containing a feed conveyor, an onward conveyor having a plurality of conveyor spaces that can be displaced along a conveyor track and containing a transfer device for transferring items to be conveyed from the feed conveyor to conveyor spaces of the onward conveyor, wherein
above the conveyor track of the onward conveyor the transfer device forms a stationary receiving space for at least one item to be conveyed, the receiving space being delimited at a bottom by a movable support element, and the support element being movable by a displacing device between a support position, in which the at least one item to be conveyed can lie flat on the support element, and a delivery position, in which the item to be conveyed can fall down unguided and in free fall by gravity through a released transfer opening downwards onto a conveyor space of the onward conveyor that has been displaced past below the receiving space.

2. The conveyor system according to claim 1, wherein the support element can be displaced linearly between the support position and the delivery position.

3. The conveyor system according to claim 1, wherein the support element can be displaced laterally out of the support position and laterally back into the support position.

4. The conveyor system according to claim 1, wherein the support element is a slide element.

5. The conveyor system according to claim 1, wherein the support element is a flexible belt having a belt section forming a support surface for the item to be conveyed.

6. The conveyor system according to claim 1, wherein the displacing device comprises at least one linear drive, which can be activated by a control device, for executing the linear movement of the support element.

7. The conveyor system according to claim 1, wherein the transfer device has a feed opening for laterally feeding the at least one item to be conveyed to the transfer device.

8. The conveyor system according to claim 1, wherein the feed opening is arranged to the side of the support element in the support position, and the transfer device has a stop opposite the feed opening for stopping the at least one item to be conveyed and being conveyed onto the support element.

9. The conveyor system according to claim 1, wherein the feed opening is arranged above the support element located in the support position.

10. The conveyor system according to claim 1, wherein the support element has an inclined support surface in the support position.

11. The conveyor system according to claim 10, wherein the support element, in the support position, has a support surface inclined in the conveying direction of the onward conveyor.

12. The conveyor system according to claim 1, wherein the receiving space is arranged a maximum of 75 cm above a conveyor space of the onward conveyor located below the receiving space.

13. The conveyor system according to claim 1, wherein the onward conveyor is a conveyor of the following type:
tray conveyor;
cross-belt conveyor, or
shoe conveyor.

14. The conveyor system according to claim 1, wherein the feed conveyor is designed for laterally feeding the items to be conveyed to the transfer device.

15. The conveyor system according to claim 1, wherein the feed conveyor for feeding the items to be conveyed to the transfer device has at least one conveyor component:
transversely to the conveying direction of the onward conveyor and/or
parallel to the conveying direction of the onward conveyor.

16. The conveyor system according to claim 1, wherein the feed conveyor contains an intermediate conveyor.

17. The conveyor system according to claim 1, wherein a plurality of transfer devices are arranged along the conveyor track of the onward conveyor.

18. The conveyor system according to claim 1, wherein the conveyor system is a sorting system for the targeted distribution of items to be conveyed and the onward conveyor is a sorter.

19. The conveyor system according to claim 1, wherein a control device which, taking into account the fall height and the fall speed of the at least one item to be conveyed, during the transfer and taking into account the position and conveying speed of the conveyor spaces of the onward conveyor, is designed for the clock-synchronous transfer of items to be conveyed to conveyor spaces of the onward conveyor that are displaced past below the receiving space.

20. The conveyor system according to claim 1, wherein the conveyor system furthermore contains a delivery conveyor for delivering items to be conveyed to the feed conveyor.

21. The conveyor system according to claim 1, wherein a sensor device for detecting the occupancy or non-occupancy of the conveyor spaces of the onward conveyor that are displaced past the sensor device is arranged along the conveying track of the onward conveyor and in the conveying direction of the onward conveyor in front of the transfer device.

22. A method for transferring items to be conveyed by means of a conveyor system according to claim 1 from a feed conveyor to conveyor spaces of an onward conveyor which are displaced along a conveyor track, wherein
at least one item to be conveyed is conveyed by the feed conveyor onto the support surface of the support element and lies flat thereon, and to transfer the at least one item to be conveyed to a conveyor space of the onward conveyor that is displaced past below the receiving space, the support element is displaced laterally away from the support position and into the delivery position via the displacing device, releasing a transfer opening, and the at least one item to be conveyed falls downward and unguided and in free fall by gravity through the released transfer opening downwards onto a conveyor space of the onward conveyor that is displaced past below the receiving space.

23. The method according to claim 22, wherein via a control device, taking into account the fall height and the fall speed of the at least one item to be conveyed during the transfer and taking into account the position and conveying speed of the conveyor spaces of the onward conveyor, there is a clock-synchronous transfer of the items to be conveyed to conveyor spaces of the onward conveyor that are displaced past below the receiving space.

24. The method according to claim 22, wherein the items to be conveyed are delivered from the transfer conveyor to the onward conveyor by means of a control device depending on a free conveyor space on the onward conveyor detected by a sensor device.

25. The method according to claim 22, wherein the items to be conveyed, in particular depending on a free conveyor space on the onward conveyor detected by a sensor device, are delivered from a delivery conveyor to the feed conveyor.

26. The conveyor system according to claim 1, wherein the onward conveyor is a tilt-tray conveyor.

* * * * *